(12) United States Patent
Hu et al.

(10) Patent No.: US 11,391,598 B2
(45) Date of Patent: Jul. 19, 2022

(54) MAP-BASED TRAFFIC SITUATION DETECTING METHOD AND DEVICE AND NON-TRANSITORY COMPUTER-READABLE MEDIUM

(71) Applicant: National Central University, Taoyuan (TW)

(72) Inventors: Chih-Lin Hu, Taoyuan (TW); Yu-Kai Huang, Taoyuan (TW); Hsiang-Yuan Chiu, Taoyuan (TW); Kun-Yu Lin, Taoyuan (TW); Sheng-Zhi Huang, Taoyuan (TW)

(73) Assignee: National Central University, Taoyuan (TW)

( * ) Notice: Subject to any disclaimer, the term of this patent is extended or adjusted under 35 U.S.C. 154(b) by 109 days.

(21) Appl. No.: 16/993,341

(22) Filed: Aug. 14, 2020

(65) Prior Publication Data
US 2021/0254993 A1    Aug. 19, 2021

(30) Foreign Application Priority Data
Feb. 14, 2020   (TW) ................................ 109104727

(51) Int. Cl.
*G01C 21/36* (2006.01)
*G01S 19/25* (2010.01)
*G01C 21/32* (2006.01)

(52) U.S. Cl.
CPC ......... *G01C 21/3691* (2013.01); *G01C 21/32* (2013.01); *G01C 21/367* (2013.01); *G01S 19/25* (2013.01)

(58) Field of Classification Search
CPC .. G01C 21/3691; G01C 21/32; G01C 21/367; G01C 21/3807; G01S 19/25; G08G 1/0125; G08G 1/0137; G06F 16/29
See application file for complete search history.

(56) References Cited

U.S. PATENT DOCUMENTS

| 10,417,914 B1 * | 9/2019 | Vose ...................... G08G 1/123 |
| 2014/0313335 A1 * | 10/2014 | Koravadi ............... H04N 7/181 |
| | | 348/148 |
| 2021/0086693 A1 * | 3/2021 | Shiga ................... H04N 5/3454 |

FOREIGN PATENT DOCUMENTS

| DE | 10155501 A1 * | 5/2003 | ........... G07B 15/063 |
| DE | 112018006030 T5 * | 9/2020 | ........... G05D 1/0274 |
| KR | 20110093584 A * | 8/2011 | ............. G05D 1/024 |
| TW | 201000934 A | 1/2010 | |

(Continued)

OTHER PUBLICATIONS

English Translation DE 10155501 A1.*

*Primary Examiner* — Rami Khatib
(74) *Attorney, Agent, or Firm* — Demian K. Jackson; Jackson IPG PLLC

(57) ABSTRACT

The present invention relates to a traffic situation detecting method. The method includes steps of acquiring a current location, a speed of movement and a direction of movement for a ground vehicle; using the current location as a starting point and drawing a detecting scope on a digital map toward the direction of movement; varying a size of the detecting scope in adaptive to an interval of the speed to which the speed of movement belongs; accessing a traffic server to retrieve a traffic event and determining whether the traffic event is situated within the detecting scope; and marking the traffic event located within the detecting scope on a digital map.

9 Claims, 12 Drawing Sheets

(56) References Cited

FOREIGN PATENT DOCUMENTS

| TW | 201800926 A | | 1/2018 | |
|---|---|---|---|---|
| WO | WO-2017220091 A | * | 12/2017 | ........... G05D 1/0289 |

* cited by examiner

| Date | Time | Lat | Lng | Event | Porvider | type | ... |
|---|---|---|---|---|---|---|---|
| 2019/11/14 | 16:22:04 | 24.9684 | 121.189 | road construction | gfsd | photo | |
| 2019/11/14 | 16:24:31 | 24.96983 | 121.19117 | jam | gfsd | photo | |
| 2019/11/14 | 16:24:31 | 24.968246 | 121.197102 | car accident | afjkl | photo | |
| 2019/11/15 | 17:51:52 | 24.9588579 | 121.1921188 | road construction | gfsd | photo | |
| 2019/11/15 | 17:51:52 | 24.968246 | 121.19226 | car accident | afjkl | photo | |
| 2019/11/15 | 17:51:52 | 24.96668 | 121.193605 | jam | aaaa | photo | |
| 2019/11/15 | 17:53:50 | 24.96561 | 121.196239 | road construction | gfsd | photo | |
| 2019/11/29 | 14:08:47 | 24.967439 | 121.19111 | road construction | gfsd | photo | |
| 2019/11/29 | 16:33:29 | 24.96344 | 121.19062 | jam | gfsd | photo | |
| 2019/11/29 | 16:33:29 | 24.967922 | 121.191152 | road construction | afjkl | photo | |
| 2019/11/31 | 13:01:40 | 24.9588579 | 121.1921188 | road construction | gfsd | photo | |
| 2019/11/31 | 13:01:40 | 24.968246 | 121.19226 | jam | afjkl | photo | |
| 2019/11/31 | 14:28:51 | 24.966789 | 121.187928 | jam | gfsd | photo | |
| 2019/11/31 | 14:30:38 | 24.968063 | 121.189097 | jam | gfsd | photo | |
| 2019/12/6 | 22:26:10 | 24.9662027 | 121.1916187 | car accident | 106523051 | photo | |
| 2019/12/6 | 23:13:55 | 24.9662027 | 121.1916187 | jam | 106523051 | photo | |
| 2019/12/6 | 23:17:07 | 24.9662027 | 121.1916187 | car accident | 106523051 | photo | |
| 2019/12/6 | 23:53:25 | 24.9675 | 121.1932 | car accident | 107523011 | photo | |
| 2019/12/7 | 00:00:11 | 24.9662027 | 121.1916187 | car accident | 106523051 | photo | |
| 2019/12/7 | 01:19:40 | 24.9662027 | 121.1916187 | road construction | 106523051 | photo | |
| 2019/12/7 | 10:58:38 | 24.9678236 | 121.1916967 | jam | 107523058 | photo | |
| 2019/12/7 | 10:59:45 | 24.9678226 | 121.1917022 | car accident | 107523058 | photo | |
| 2019/12/7 | 11:31:19 | 24.9675 | 121.1924983 | jam | 107523011 | photo | |
| 2019/12/7 | 11:42:27 | 24.967832 | 121.1917084 | car accident | 106523051 | photo | |
| 2019/12/7 | 14:45:29 | 24.96267 | 121.1905 | road construction | 107523011 | photo | |
| 2019/12/7 | 14:45:29 | 24.96985 | 121.19323 | jam | 107523011 | photo | |
| 2019/12/7 | 15:25:28 | 24.9651656 | 121.1911242 | car accident | 106523051 | photo | |
| 2019/12/7 | 16:28:00 | 24.9677471 | 121.1918058 | car accident | 106523051 | photo | |
| 2019/12/17 | 15:41:29 | 24.967915 | 121.1891 | road construction | gfsd | photo | |
| 2019/12/30 | 14:59:15 | 24.968815 | 121.194 | road construction | gfsd | photo | |
| 2019/12/30 | 22:00:00 | 24.968618 | 121.195469 | road construction | afjkl | photo | |
| 2020/1/1 | 12:56:59 | 24.966865 | 121.190847 | road construction | gfsd | photo | |
| 2020/1/2 | 14:47:51 | 24.96745 | 121.18962 | road construction | gfsd | photo | |
| 2020/1/17 | 14:24:18 | 24.9667 | 121.1937 | road construction | gfsd | photo | |
| 2020/1/17 | 14:24:18 | 24.9667 | 121.1911 | jam | afjkl | photo | |
| 2020/1/17 | 16:39:44 | 24.9649761 | 121.1909247 | jam | hychiu | photo | |
| 2020/1/19 | 19:17:30 | 24.9667 | 121.1926 | road construction | gfsd | photo | |
| 2020/1/19 | 19:17:30 | 24.96608 | 121.19054 | jam | ssujugu | photo | |
| 2020/1/19 | 19:17:30 | 24.96741 | 121.1892 | car accident | ffsaf | photo | |
| ... | | | | | | | ... |

FIG. 8

MAP-BASED TRAFFIC SITUATION DETECTING METHOD AND DEVICE AND NON-TRANSITORY COMPUTER-READABLE MEDIUM

FIELD

The present invention relates to a map-based traffic situation detecting method, device and a non-transitory computer-readable medium storing the corresponding computer program including instructions to implement the traffic situation detecting method, in particular to a map-based traffic situation detecting method, device and a non-transitory computer-readable medium capable of adaptively varying a size of detecting scope in response to different speed.

BACKGROUND

In general, it is very helpful for car and motorcycle drivers if they can know the changes in traffic situation of front roads early, especially unplanned traffic situations such as temporary traffic events or some sudden traffic situations, such as whether there is a sudden car accident in front roads, whether there is a traffic jam in front roads, or there are temporary road constructions in front roads. Generally, the drivers are not easy to know these unplanned traffic situations unless they have driven near the scene.

Although there are already real-time traffic reports broadcast through radio broadcasting systems in conventional technology, these reports are for only a small part of the vast road network, and most of the drivers may not be traveling through the road section where the traffic situation of the report occurred. Even if an unplanned traffic situation such as a temporary traffic incident or a sudden road situation occurred on the road section where the driver is traveling currently, real-time traffic report may not have content corresponding to this unplanned traffic situation.

Unlike general static or permanent road situations, such as unplanned traffic situations including lane reduction, intersections or speed limits, it is hard to early alert drivers about above-mentioned unplanned traffic situations such as temporary traffic events or some unexpected road situations to make the drivers respond early to ensure drive safety by setting up fixed signs, markings or signs, etc.

When the driver suddenly encounters the above-mentioned unplanned road situations without receiving an alert, the driver has to reduce the speed or make appropriate and safe response in a short time; however, the driver may also be too late to respond in above-mentioned situation, and it increases the risk of driving. These unplanned road situations often further cause other temporary traffic incidents or sudden road situations.

With the rapid development of cloud technology and application of the location-based service (LBS) combined in the conventional technology, a remote traffic information server is developed to record all unplanned traffic situations occurred in the road network, and a driver can access the remote traffic information server through the traffic application (App) installed on a mobile phone, so that the driver has opportunity to learn about the unplanned traffic situation in front roads to early make driving response, such as action of changing lane, slowing down, or even stopping driving early, thereby ensuring driving safety.

However, the conventional traffic application always provides a large amount of road situations to the driver without considering the current speed of the driver's vehicle, so in practice use, the driver traveling in high speed may be too late to read these road situations before arriving the accident site; or, the conventional traffic application may provide some invalid road situations that will not appear in the driver's sight or view, but not provide the road situations that may actually affect driving safety, and it causes bad user experiences.

Hence, there is a need to solve the above deficiencies/issues.

SUMMARY

The present invention provides a traffic situation detecting method, a traffic situation detecting device and a non-transitory computer-readable storage medium storing a computer program product or a computer program thereof which can vary the size and a covering area of a detecting scope on the digital map in adaptive to different speed of movement based on a current location, a direction and a speed of movement for a vehicle, and access a remote traffic server to search a traffic event situated within the detecting scope, and mark the traffic event on the digital map, and issue an alert to a user. The method described in the present invention can be implemented independently, or be integrated in a digital map navigation service. Particularly, the method described in the present invention is suitable for providing a driver with unplanned traffic situation such as a temporary traffic event or a sudden traffic situation, and traffic information related to driving safety, so that the driver can early respond calmly.

According to an embodiment, the present invention defines different intervals of the speed for the speed of the vehicle, and in a lower speed condition in which the user can have sufficient response time, so a wider detecting scope, which has a larger view angle and a shorter detection distance, is set to provide the user with more traffic event information; in a higher speed condition in which the user has a shorter response time only, a longer and narrower detecting scope, which has a smaller angle of view and a longer distance, is set to facilitate the user to have sufficient response time for a traffic situation or road situation, so as to improve driving safety. The method described in the present invention also can solve the above-mentioned conventional problems.

The present invention provides a traffic situation detecting method, including: acquiring a current location, a speed of movement and a direction of movement for a ground vehicle; using the current location as a starting point and drawing a detecting scope on a digital map toward the direction of movement; varying a size of the detecting scope in adaptive to an interval of the speed to which the speed of movement belongs; accessing a traffic server to retrieve a traffic event and determining whether the traffic event is situated within the detecting scope; and marking the traffic event located within the detecting scope on a digital map.

Preferably, the traffic situation detecting method further includes one of steps: acquiring the current location for the ground vehicle through a mobile device, and calculating the speed of movement and the direction of movement based on the current location; acquiring the speed of movement for the ground vehicle through an in-vehicle computer; determining the interval of the speed to which the speed of movement belongs, to set a detection parameter corresponding to the determined interval of the speed; performing a detecting scope drawing process based on the detection parameter; displaying the digital map on a screen; checking a position of the detecting scope on the digital map; marking the current location on the digital map, using the current location as the starting point and drawing the detecting scope toward the direction of movement; adaptively setting the detection parameter to vary the size of the detecting scope based on the determined interval of the speed; accessing a traffic event table of the traffic server; reading the traffic event table to determine whether a traffic event is situated within the detecting scope: marking the traffic event located within the detecting scope on a digital map; and issuing an alert to prompt a user for the traffic event located within the detecting scope.

Preferably, the detecting scope drawing process includes one of steps: determining values of the detection distance and the detection angle; on the digital map, using the current location as the starting point and drawing a straight line toward the direction of movement, and using the detection distance as a length of the straight line; calculating and drawing a perpendicular bisector of the straight line; using the current location as the starting point and using the detection angle or a half of the detection angle as an included angle to draw a right line and a left line on left and right sides of the straight line, respectively; using a crossover point of the right line and the perpendicular bisector, and a crossover point of the left line and the perpendicular bisector as a left point and a right point, respectively; connecting the current location, the left point and the right point to obtain a first triangle; duplicating the first triangle, and flipping duplicate of the first triangle upside down to obtain a second triangle; combining the first triangle and the second triangle to form a symmetrical diamond as the detecting scope; and displaying the drawn detecting scope on the digital map.

The present invention further provides a traffic situation detecting device configured to have a processor to implement a traffic situation detecting method, the method including: acquiring a current location, a speed of movement and a direction of movement for a ground vehicle; using the current location as a starting point and drawing a detecting scope on a digital map toward the direction of movement; adaptively varying a size of the detecting scope in response to an interval of the speed to which the speed of movement belongs; accessing a traffic server to retrieve a traffic event and determining whether the traffic event is situated within the detecting scope; and marking the traffic event located within the detecting scope on a digital map.

The present invention further provides a non-transitory computer-readable medium storing thereon a computer program including instructions that, when executed by a processor, cause the processor to perform a traffic situation detecting method, by executing the steps including: acquiring a current location, a speed of movement and a direction of movement for a ground vehicle; using the current location as a starting point and drawing a detecting scope on a digital map toward the direction of movement; adaptively varying a size of the detecting scope in response to an interval of the speed to which the speed of movement belongs; accessing a traffic server to retrieve a traffic event and determining whether the traffic event is situated within the detecting scope; and marking the traffic event located within the detecting scope on a digital map.

DESCRIPTION OF THE DRAWINGS

A more complete appreciation of the invention and many of the attendant advantages thereof are readily obtained as the same become better understood by reference to the following detailed description when considered in connection with the accompanying drawing, wherein:

FIG. 8 is a schematic diagram illustrating a traffic event table to be accessed in the method described in the present invention;

DETAILED DESCRIPTION

Figure 1:
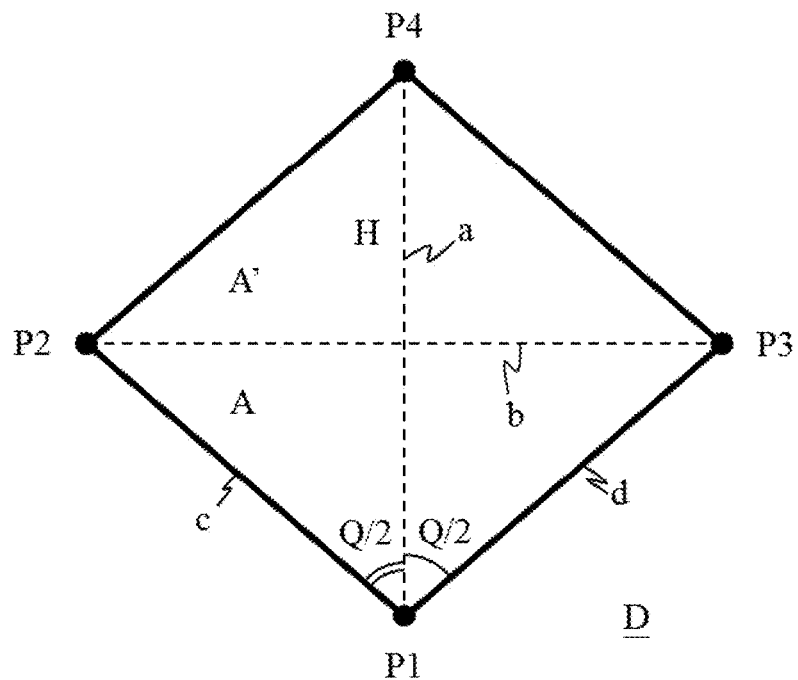
FIG. 1 is a schematic diagram illustrating a detecting scope drawn according to a first embodiment in accordance with the present invention.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice.

It is to be noticed that the term "including", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

The disclosure will now be described by a detailed description of several embodiments. It is clear that other embodiments can be configured according to the knowledge of persons skilled in the art without departing from the true technical teaching of the present disclosure, the claimed disclosure being limited only by the terms of the appended claims.

The location described in the following paragraphs, such as the current location, the location of a traffic event, the location of a road event, or the other location, can be a geographic location which can be positioned by a longitude and a latitude; the speed described in the following paragraphs is indicated in the unit of km/hr, and preferably, the speed is defined by a traveling length in the unit of kilometer and along a moving path per hour. In an embodiment, the ground vehicle can be, for example but not limited to, one of a vehicle, a car, a four wheeled car, a three wheeled motorcycle, a two wheeled motorcycle, a bicycle, a ground internal combustion engine (ICE) vehicle, and a ground electric vehicle. In an embodiment, the movable device can be, for example but not limited to, a non-fixed and mobile electronic device which is one of a smart phone, a notebook computer, a tablet device, an in-vehicle computer and a mobile device, and the mobile device includes a hardware processor or a central processor capable of executing programming instruction.

Preferably, with adaptively variable detecting scope map-based traffic situation detecting method described in the present invention can be programmed as an mobile application (App) which is uploaded into and executed in the movable device, and the mobile application can acquire the current location, the speed of movement and the direction of movement for the ground vehicle, mark the current location of the ground vehicle on a digital map, and draw a detecting scope, which can vary size in adaptive or self-adaptive to different speed of the movement, toward the direction of the movement, and after the detecting scope is determined, the mobile application can be linked to and access a remote traffic server through internet network, to retrieve multiple locations of traffic events and determine whether there is any traffic event situated within the detecting scope, and if at least one traffic event is situated within the detecting scope, the mobile application marks the traffic event located within the detecting scope on the digital map and selectively issue voice alert, alert sound, SMS, or other notice with unlimited form, to the user.

First, when the application (computer program or computer program product) is loaded into the mobile device such as but not limited to a smart phone, or the system where the application is installed is turned on, the application starts to acquire the information related to the ground vehicle through various manners, for example, the information can include the current location, the speed of movement, the direction of movement for the ground vehicle. In an embodiment, after the application is loaded into the smart phone and activated, the application starts to read the data sensed by the various sensors built in the smart phone according to an instruction; various sensors can include, for example but not limit to, an accelerometer, a gyro-meter, a Wi-Fi module, or a GPS module. After the current location of the ground vehicle is determined based on the sensed data, the information such as the speed of movement and the direction of movement can be calculated based on the current location. In another embodiment, the application executed on the smart phone can be selectively linked to and in communication with an in-vehicle computer on the ground vehicle, to acquire real-time wheel speed data from the in-vehicle computer, and use the real-time wheel speed data as the speed of the movement.

In the embodiment of the present invention, the speed of movement is classified as one of multiple intervals of the speeds actively, and the intervals of the speed are set with different detection parameters, respectively, so that the detecting scope of different size can be drawn on the digital map selectively. For example, for the speed of the ground vehicle, the App can define three intervals of the speed below, but the present invention is not limited to these examples.

The first interval is an interval of low speed. In an urban area, the ground vehicle is mostly moving at a low speed; because of congested traffic environment and narrow roads, when a road incident occurs in one of places of the urban area, the road incident is easy to affect the quality of the surrounding traffic. Therefore, a detection angle can be set larger to provide a wider perception range and detect more road situations which may actually affect driving of the ground vehicle. Furthermore, the speed of movement for the ground vehicle in the urban area is slower and the driver generally has time to respond to the road situation, so a detection distance can be set shorter. Therefore, the App can set the speed of the ground vehicle less than V1 to belong to the interval of the low speed.

The second interval is an interval of medium speed. When the ground vehicle is driving on a provincial highway which is wider than general roads and less affected by urban roads, the detection angle can be set smaller than and the detection distance can be set longer than that of the interval of low speed, so as to facilitate the user to prepare response in advance. Therefore, the App can set the speed between V1 and V2 to belong to the interval of medium speed.

The third interval is an interval of high speed. When the ground vehicle is driving on the national highway in a high speed, the traffic situations of the national highway are not easily affected by the surrounding provincial or county roads, so the detection angle can be decreased to exclude invalid road situations, which do not affect the driving of the ground vehicle; furthermore, when driving at a high speed, the driver needs more time to read and respond the road situation, so it is necessary to set a longer detection distance to provide the driver more time to respond. Therefore, the App can set the speed higher than V2 to belong to the interval of the high speed.

The default values of V1 and V2 can be preset by the App or inputted and set by a user. In an embodiment, according to the real-time freeway condition webpage "1968.freeway.gov.tw", an average speed of vehicles in smooth traffic is generally above 80 km/hr, and a speed limit of provincial highway is generally in a range of 70 km/hr to 80 km/hr, and a speed limit of a county road is mostly in a range of 50 km/hr to 60 km/hr; therefore, in general, the speed lower than 50 km/hr can be considered as a low speed, and the speed greater than 80 km/hr can be considered as a high speed, so the App can provide a set of basic default values for V1 and V2 based on above-mentioned speed examples, for example, V1=50 km/hr and V2=80 km/hr; however, the present invention is not limited to above-mentioned examples.

After the intervals of the speed is set, the detecting scope corresponding to each of intervals of the speed can be set. According to the motorcycle defensive driving manual of the automotive research & testing center (ARTC), there is a relationship between a speed of movement and an angle of driver's view, and the relationship is shown below:

|  | Low speed | Medium speed | High speed |
|---|---|---|---|
| Driving speed (km/hr) | <50 | 50~80 | >80 |
| Angle of view (degree) | About 90 | About 60 | About 50 |

After the angle of view is determined, the App of the present invention provides the driver with, for example but not limited to, a reaction time of 40 seconds to respond to each traffic event, based on reasonable assumption; therefore, before the ground vehicle reaches the location of the traffic event, the driver must be reminded 40 seconds in advance. In this embodiment, the detecting scope can be set as a symmetrical diamond; according to the above values of angle of view, the actual detection distance of each interval of the speed can be calculated as follows.

(1) For the interval of the low speed, a preferable detection distance can be calculated based on the driving distance for the ground vehicle to drive at a speed of 50 km/hr for 40 seconds, and the calculation result is about 555 m.

(2) For the interval of the medium speed, a preferable detection distance can be calculated based on the driving distance for the ground vehicle to drive at a speed of 65 km/hr, which is a median between 50 km/hr and 80 km/hr, for 40 seconds, and the calculation result is about 720 m.

(3) For the interval of high speed, the preferable detection distance can be calculated based on the driving distance for the ground vehicle to drive at a speed of 80 km/h for 40 seconds, and the calculation result is about 888 m. In summary, in a condition that V1=50 km/hr, V2=80 km/hr and the detecting scope is a symmetrical diamond, the intervals of the speed and the related detection parameters are collected in the table below:

|  | Low speed | Medium speed | High speed |
|---|---|---|---|
| Speed (km/hr) | <50 | 50~80 | >80 |
| Default value of detection angle (degree) | 100 | 70 | 50 |
| Default value of detection distance (m) | 555 | 720 | 888 |

After the App acquires the necessary information, especially the speed of movement, the App can quickly determine that the speed of movement belongs to which interval of the speed. After the interval of the speed to which the speed of movement belongs is determined, the App can determine the detection parameter and continue to execute a detecting scope drawing process.

FIG. 1 is a schematic diagram illustrating a detecting scope drawn according to a first embodiment in accordance with the present invention. When the App of the present invention is executed to draw the detecting scope on the digital map actually, the detecting scope drawing process for drawing the detecting scope D, as shown in FIG. 1, on the digital map displayed on the screen can include following steps.

In a step (1), a current location P1, which indicates the location of the ground vehicle, the App, the movable device or the user, is used as a starting point to draw a straight line a toward the direction of movement, a length H of the straight line a is the default value of the detection distance, and an end point of the straight line a is defined as a front point P4.

In a step (2), a perpendicular bisector of the straight line a is calculated and drawn.

in a step (3), based on the current location P1 used as the starting point and a half of the default value Q of the detection angle used as an included angle, two straight lines c and d are drawn on left and right sides of the straight line a, respectively.

In a step (4), a crossover point of the straight line c and the perpendicular bisector, and a crossover point of straight line d and the perpendicular bisector are defined as a left point P2 and a right point P3, respectively.

In a step (5), the current location P1, the left point P2 and the right point P3 are connected to obtain a triangle A, which is defined as a first triangle.

In a step (6), the triangle A is duplicated, and the duplicate of triangle A is flipped upside down to obtain a triangle A', which is defined as a second triangle.

In a step (7), the triangles A and A' are combined to form a symmetrical diamond, which is the detecting scope D of the App.

In a step (8), the drawn detecting scope D is displayed on the digital map of the screen.

Figure 2:
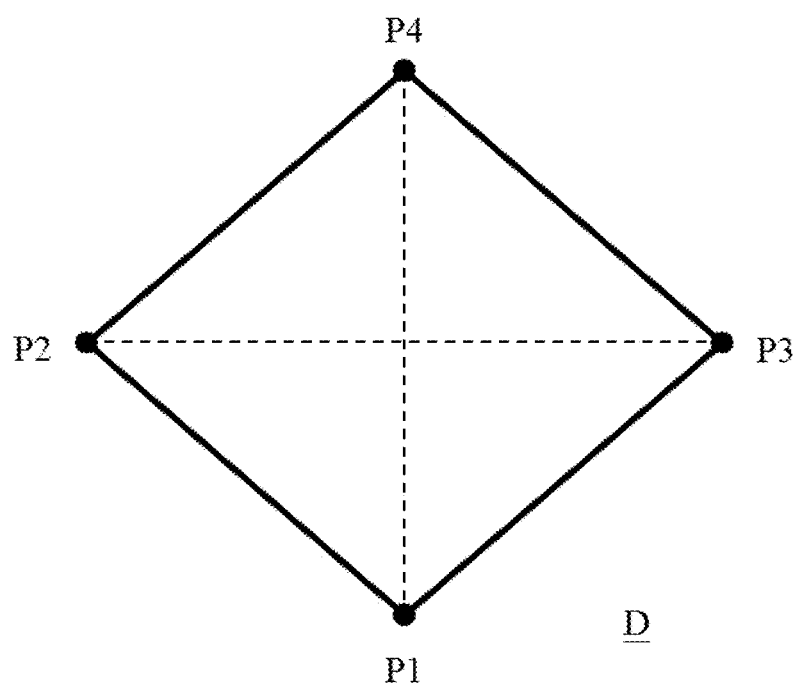
FIG. 2 is a schematic diagram illustrating a symmetrical diamond detecting scope drawn for the interval of low speed, according to the first embodiment of the method described in the present invention.
Figure 3:
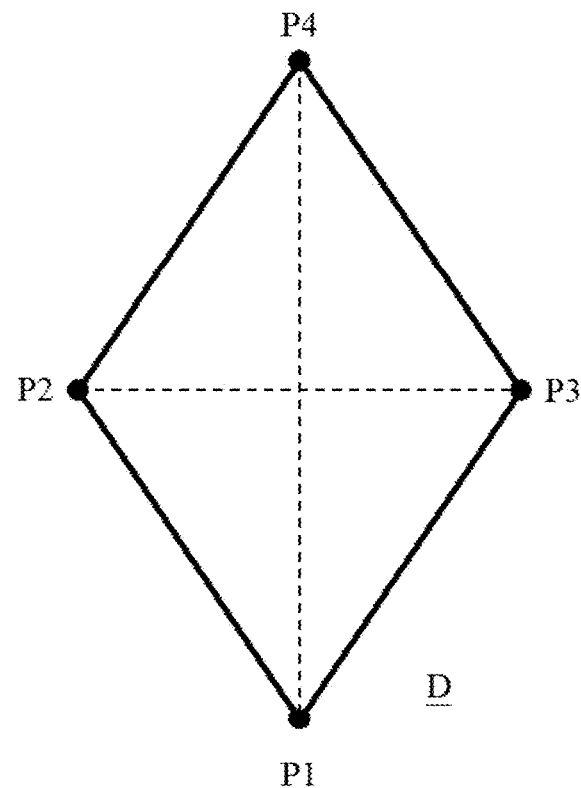
FIG. 3 is a schematic diagram illustrating a symmetrical diamond detecting scope drawn for the interval of medium speed, according to the first embodiment of the method described in the present invention.
Figure 4:
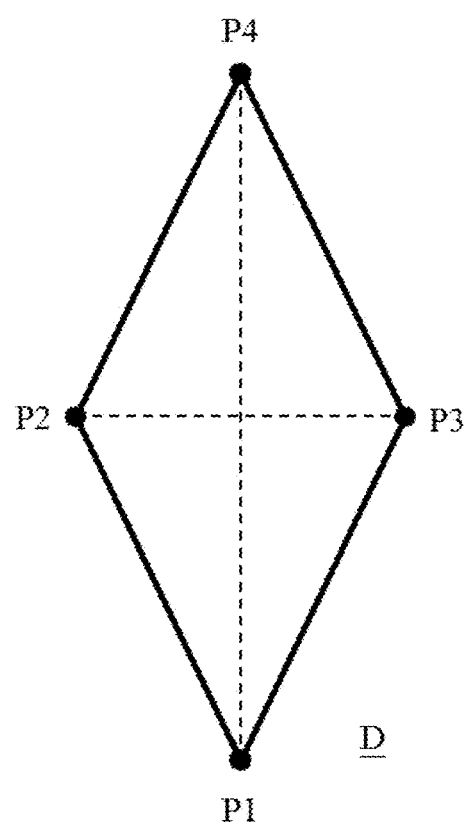
FIG. 4 is a schematic diagram illustrating a symmetrical diamond detecting scope drawn for the interval of high speed, according to the first embodiment of the method described in the present invention.

FIG. 2 is a schematic diagram illustrating a symmetrical diamond detecting scope drawn for the interval of low speed, according to the first embodiment of the method described in the present invention. FIG. 3 is a schematic diagram illustrating a symmetrical diamond detecting scope drawn for the interval of medium speed, according to the first embodiment of the method described in the present invention. FIG. 4 is a schematic diagram illustrating a symmetrical diamond detecting scope drawn for the interval of high speed, according to the first embodiment of the method described in the present invention. The detection parameters of intervals of different speeds, such as low speed, medium speed and high speed, are used in the above-mentioned detecting scope drawing process to draw the detecting scopes corresponding to the intervals of different speed, respectively. In this embodiment, the shape used for the detecting scope is a symmetrical diamond, as shown in FIG. 2 to FIG. 4.

Figure 5:
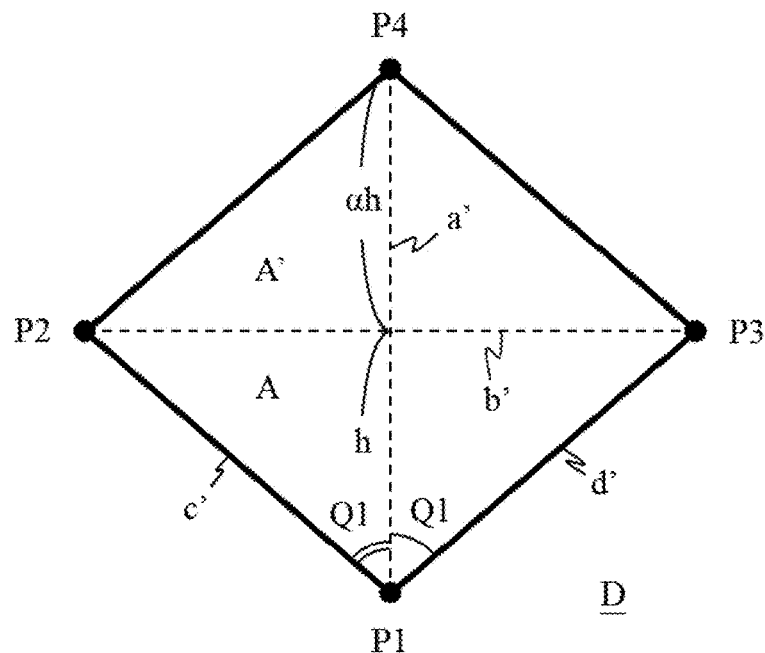
FIG. 5 is a schematic diagram illustrating an asymmetrical diamond detecting scope drawn for the interval of low speed, according to a second embodiment of the method described in the present invention.
Figure 6:
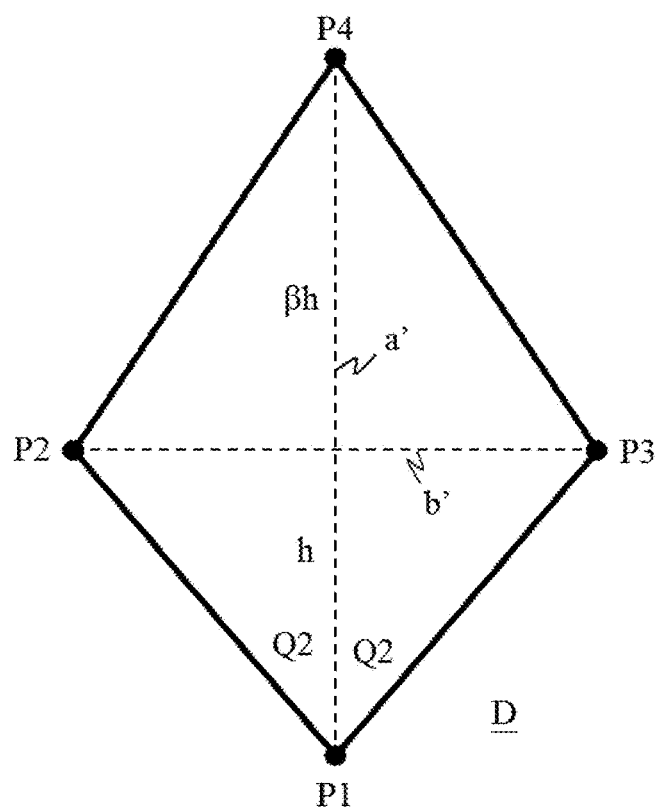
FIG. 6 is a schematic diagram illustrating an asymmetrical diamond detecting scope drawn for the interval of medium speed, according to the second embodiment of the method described in the present invention.
Figure 7:
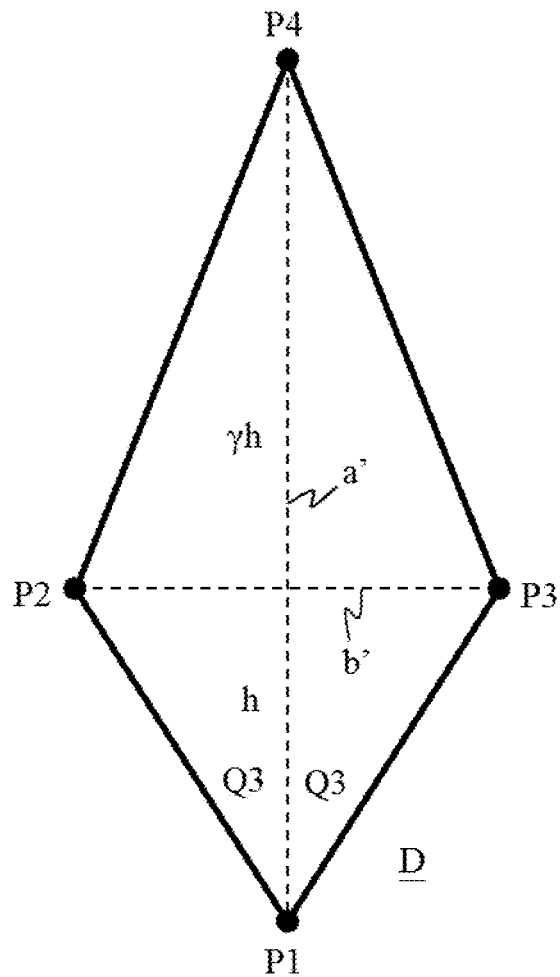
FIG. 7 is a schematic diagram illustrating an asymmetrical diamond detecting scope drawn for the interval of high speed, according to the second embodiment of the method described in the present invention.

FIG. 5 is a schematic diagram illustrating an asymmetrical diamond detecting scope drawn for the interval of low speed, according to a second embodiment of the method described in the present invention. FIG. 6 is a schematic diagram illustrating an asymmetrical diamond detecting scope drawn for the interval of medium speed, according to the second embodiment of the method described in the present invention. FIG. 7 is a schematic diagram illustrating an asymmetrical diamond detecting scope drawn for the interval of high speed, according to the second embodiment of the method described in the present invention. The shape of the detecting scope used in the method described in the present invention is not limited to the symmetrical diamond; for example, in other embodiment with the same inventive concept and calculation logic, the shape of the detecting scope can be an asymmetrical diamond, a polygon, a quadrangle, a sector or a triangle.

For example, according to the inventive concept and calculation logic the same as the first embodiment, during the detecting scope drawing process executed by the App, in order to generate the detecting scope for the interval of low speed, the straight line a' can be divided into h and ah sections based on a detection ratio $\alpha$ and a detection length h, and a central line b' is then drawn at an interface between the section h and section ah, and the detection angle Q1 dedicated for the interval of low speed is used to draw two straight lines c' and d', and the four end points P1, P2, P3 and P4 are connected by lines to draw the asymmetrical diamond as the low-speed detecting scope for the App to use, as shown in FIG. 5. In order to generate the detecting scope for the interval of medium speed, the straight line a' is divided into section h and section $\beta$h based on a detection ratio $\beta$ and a detection length h, and a central line b' is drawn at the interface between the section h and section $\beta$h, the detection angle Q2 dedicated for the interval of medium speed is used to draw the asymmetrical diamond for the medium-speed detecting scope for the App to use, as shown in FIG. 6. In order to generate detecting scope for the interval of high speed, the straight line a' is divided into a section h and a section $\gamma$h based on a detection ratio $\gamma$ and a detection length h, and a central line b' is drawn at an interface between the section h and the section $\gamma$h, and the detection angle Q3 dedicated for the interval of high speed is used to draw the asymmetrical diamond as the high-speed detecting scope for the App to use, as shown in FIG. 7. Preferably, the detection ratio parameters $\alpha$, $\beta$, $\gamma$ satisfy a relationship $\alpha<\beta<\gamma$, and the detection angle parameter Q1, Q2 and Q3 satisfy a relationship Q1>Q2>Q3. When $\alpha=\beta=\gamma=1$ and Q1, Q2 and Q3 are substituted as the detection angle preset values of the first embodiment, respectively, the symmetrical diamond described in the first embodiment can be drawn in the detecting scope drawing process.

FIG. 8 is a schematic diagram illustrating a traffic event table to be accessed in the method described in the present invention. After determining the detecting scope, the App can be linked to and access a remote traffic server to retrieve locations of multiple traffic events through internet network. The traffic events can be recorded in, for example but not limited to, a traffic event table which can be accessed by the App. The traffic event table stored on the traffic server can be a document form substantially recording information including date, time, longitude, latitude, event category (title), provider (uploader), and record type.

After the detecting scope is determined, the latitudes and longitudes covered by the detecting scope are also determined, the App can access the traffic event table and then compare the latitude and longitude of the traffic event being occurred at current time with the latitudes and longitudes covered by the detecting scope, so as to determine whether there is any traffic event occurred and situated within the detecting scope at current time; if at least one traffic event situated within the detecting scope at current time, the App instantly marks the traffic event located within the detecting scope by, for example but not limited to, a small icon or a symbol, and selectively issues a real-time voice alert, alert sound, a text SMS or other notification with unlimited form, to the user correspondingly.

Figure 9:
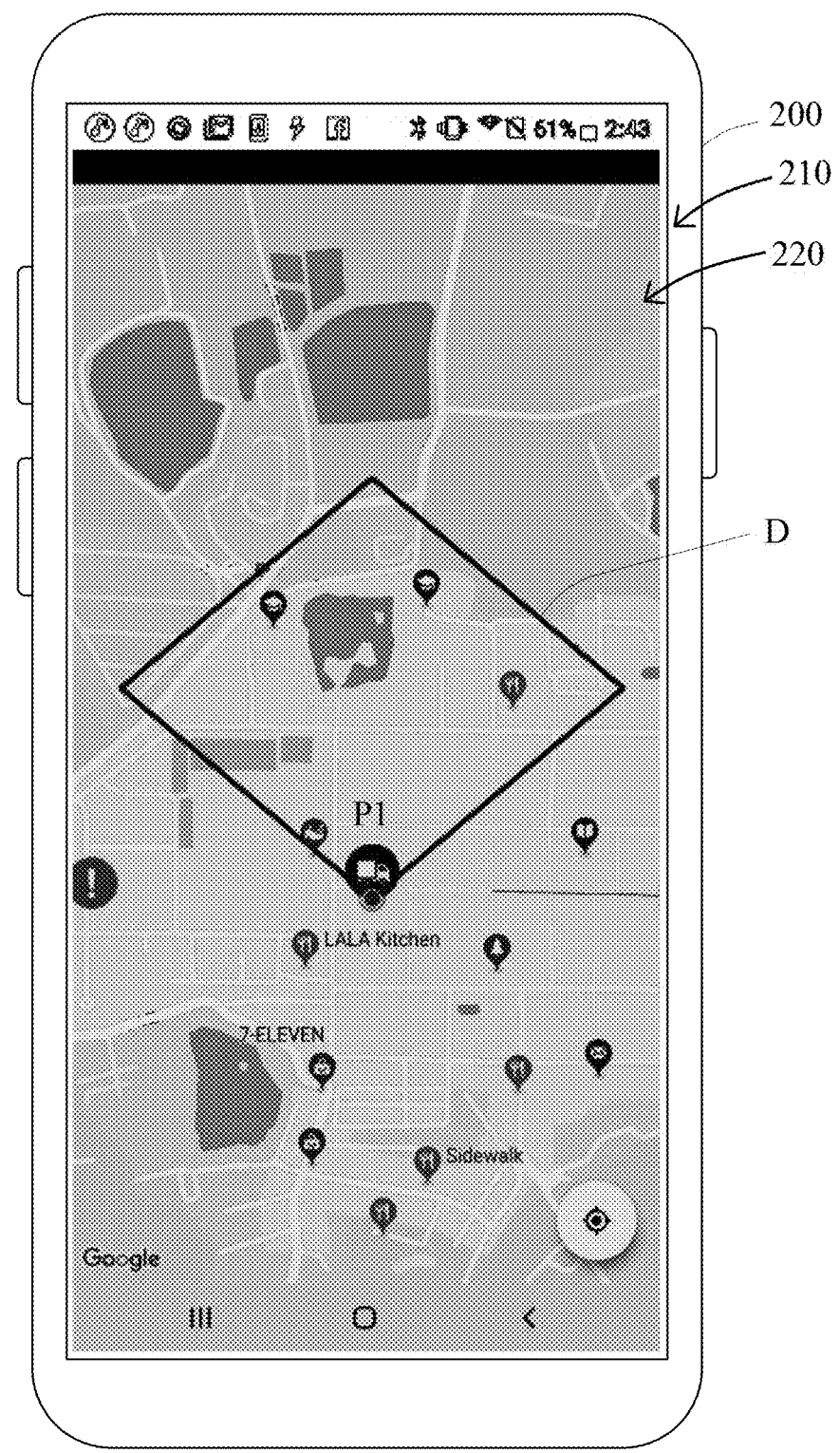
FIG. 9 is a schematic diagram illustrating a detecting scope drawn and shown on a digital map displayed on a graphical user interface of a screen of a smart phone by an App in an interval of low speed, according to the method described in the present invention.
Figure 10:
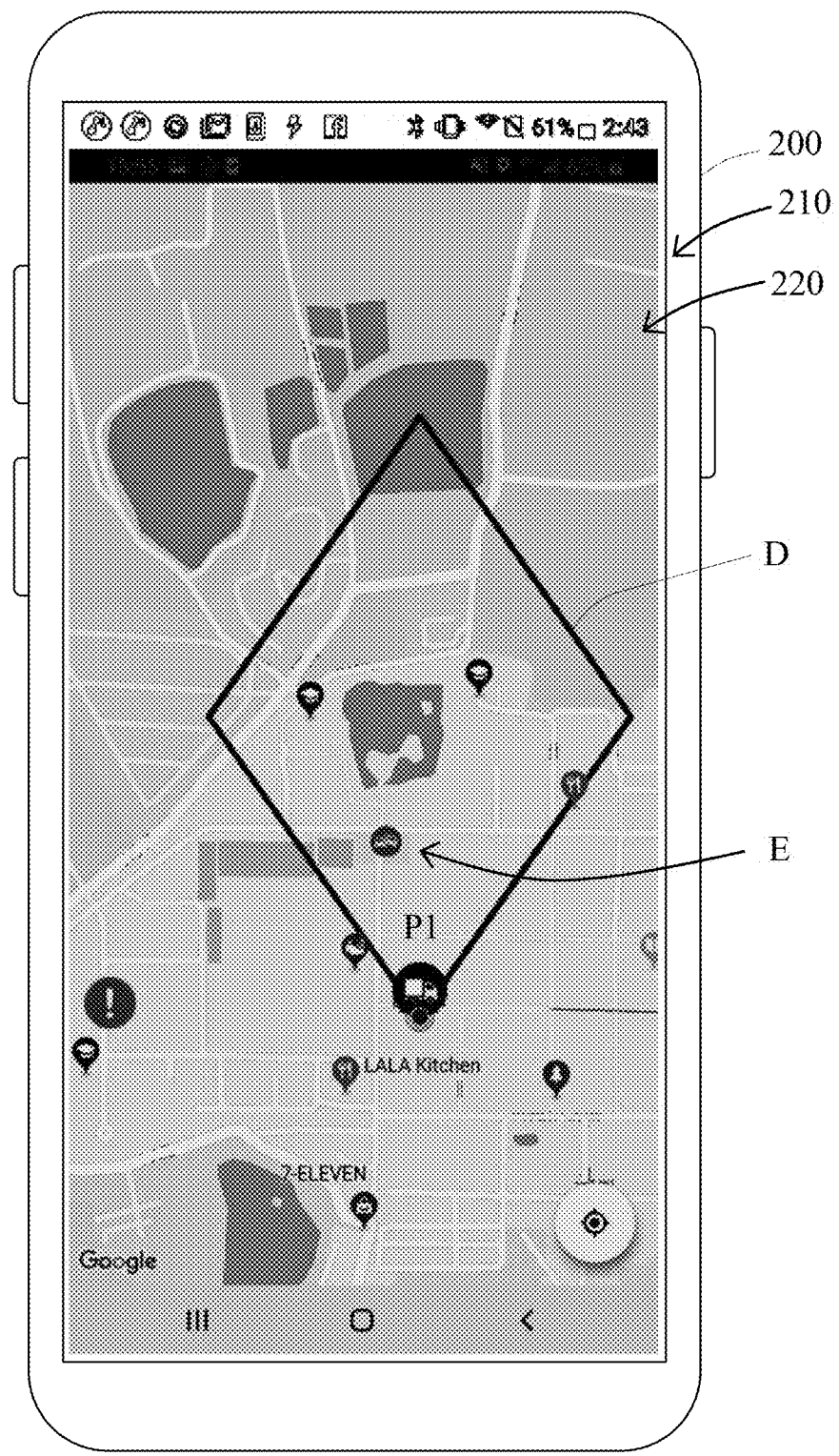
FIG. 10 is a schematic diagram illustrating a detecting scope drawn and shown on a digital map displayed on a graphical user interface of a screen of a smart phone by an App in interval of medium speed, according to the method described in the present invention.
Figure 11:
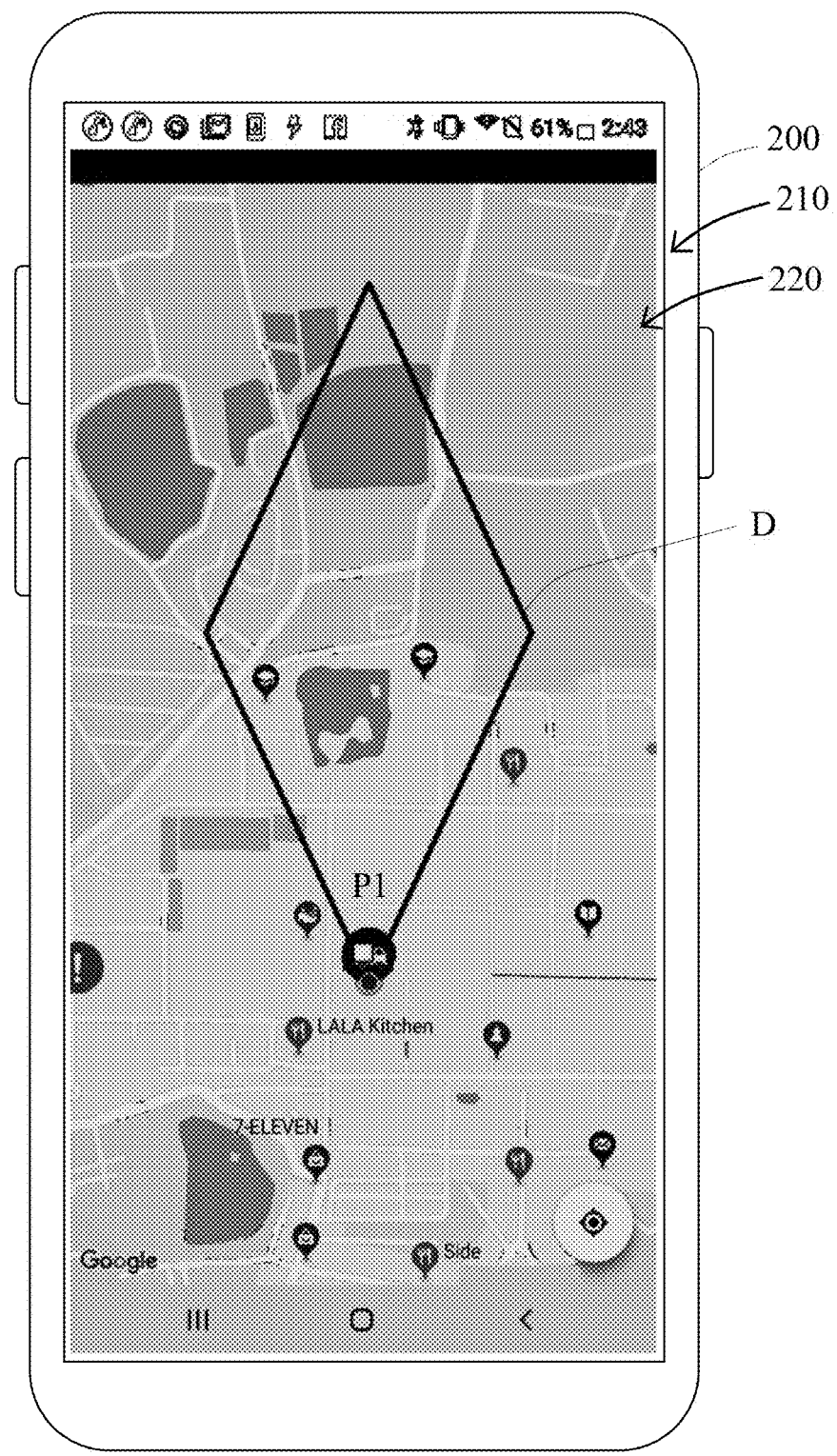
FIG. 11 is a schematic diagram illustrating a detecting scope drawn and shown on a digital map displayed on a graphical user interface of a screen of a smart phone by an App in interval of high speed, according to the method described in the present invention.

FIG. 9 is a schematic diagram illustrating a detecting scope drawn and shown on a digital map displayed on a graphical user interface of a screen of a smart phone by an App in an interval of low speed, according to the method described in the present invention. FIG. 10 is a schematic diagram illustrating a detecting scope drawn and shown on a digital map displayed on a graphical user interface of a screen of a smart phone by an App in interval of medium speed, according to the method described in the present invention. FIG. 11 is a schematic diagram illustrating a detecting scope drawn and shown on a digital map displayed on a graphical user interface of a screen of a smart phone by an App in interval of high speed, according to the method described in the present invention. The App implementing the method described in the present invention can be, for example, loaded into a smart phone 200, and after the App is initialized and activated, the App loads a digital map 220, such as but not limited to, the Google Map, and displays the digital map 220 on the graphical user interface on a screen 210 for the user to view.

In this embodiment, the App for implementing the method described in the present invention can read the current location based on an instruction, and calculate information such as the speed of movement and the direction of movement, and then determine the interval of the speed to which the speed of movement belongs and determine the related detection parameter, and mark the current location P1 indicating the current location of the ground vehicle, the App, the movable device or the user on the digital map; next, according to the aforementioned steps, the current location P1 is used as the starting point, to draw the detecting scope D toward the direction of movement based on the detection parameter corresponding to the determined interval of the speed, and the size of the detecting scope D corresponds to the detection parameter corresponding to the determined interval of the speed.

When the speed of movement belongs to the interval of low speed, the App draws and displays a wider and flatter detecting scope D on the digital map of the screen of the mobile phone, as shown in FIG. 9. When the speed of movement belongs to the interval of medium speed, the App draws and displays the detecting scope D with a substantially long and narrow shape on the digital map of the screen of the mobile phone, as shown in FIG. 10. When the speed of movement belongs to the interval of high speed, the App draws and displays the detecting scope D with a long and narrow shape on the digital map of the screen of the mobile phone, as shown in FIG. 11, so as to facilitate the user to have more response time. With the continuously change of the current location, the direction of movement and the speed of movement, the App continuously updates and adjusts the location, size or shape of the detecting scope on the digital map, and particularly varies the size of the detecting scope in response to different interval of the speed, to facilitate to detect the traffic event situated within the detecting scope in real time and issue alert to the user. Every time the detecting scope is updated, the App searches the traffic event situated within the detecting scope and prompts the user again.

For example, when the user drives a small truck at a speed of 55 km/hr and the App of the present invention is executed on the smart phone, as shown in FIG. 10, the speed of movement of the ground vehicle belongs to the interval of medium speed, after the App acquires the current location P1, the App draws the detecting scope D with a substantial long and narrow shape toward the direction of movement, and scans the detecting scope D to check whether there is any traffic event occurred within the detecting scope D. After the App scans the detecting scope D and determines that a traffic event E situated within the detecting scope D at current time, the App marks the traffic event E by a small icon in the detecting scope D on the digital map. If the speed of the small truck is decreased to 35 km/hr, the App adjusts the shape of the detecting scope D to a wider and flatter shape as shown in FIG. 9. With continuous change in movement of the small truck, the App dynamically adjusts the display position of the detecting scope D in real time, and continuously scans the detecting scope D to check whether there is any new traffic event situated in the detecting scope D.

Figure 12:
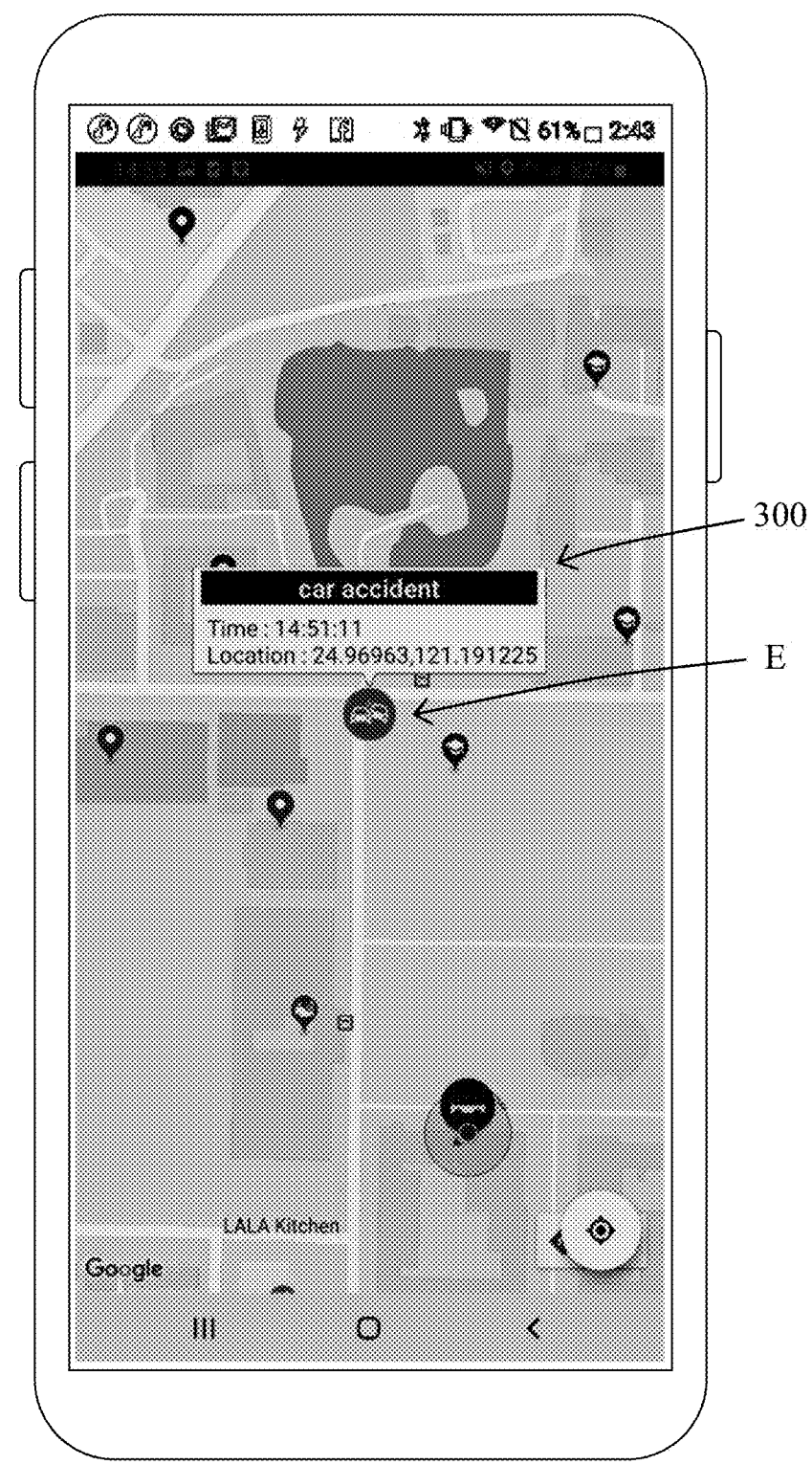
FIG. 12 is a schematic diagram illustrating a traffic event query window of the App in response to a clicking operation, according to the method described in the present invention.

FIG. 12 is a schematic diagram illustrating a traffic event query window of the App in response to a clicking operation, according to the method described in the present invention. The user can click the small icon indicating the traffic event E on the digital map displayed on the screen, to query all details of the traffic event, for example, the details can include occurrence time and detailed location. After the user clicks the small icon, the App pops up a traffic event query window 300 on the digital map in response to the querying operation of the user, as shown in FIG. 12, and the traffic event query window 300 displays information including an event category (title), an occurrence time, and an occurrence location (positioned by longitude and latitude coordinates) in response to the querying operation of the user.

Figure 13:
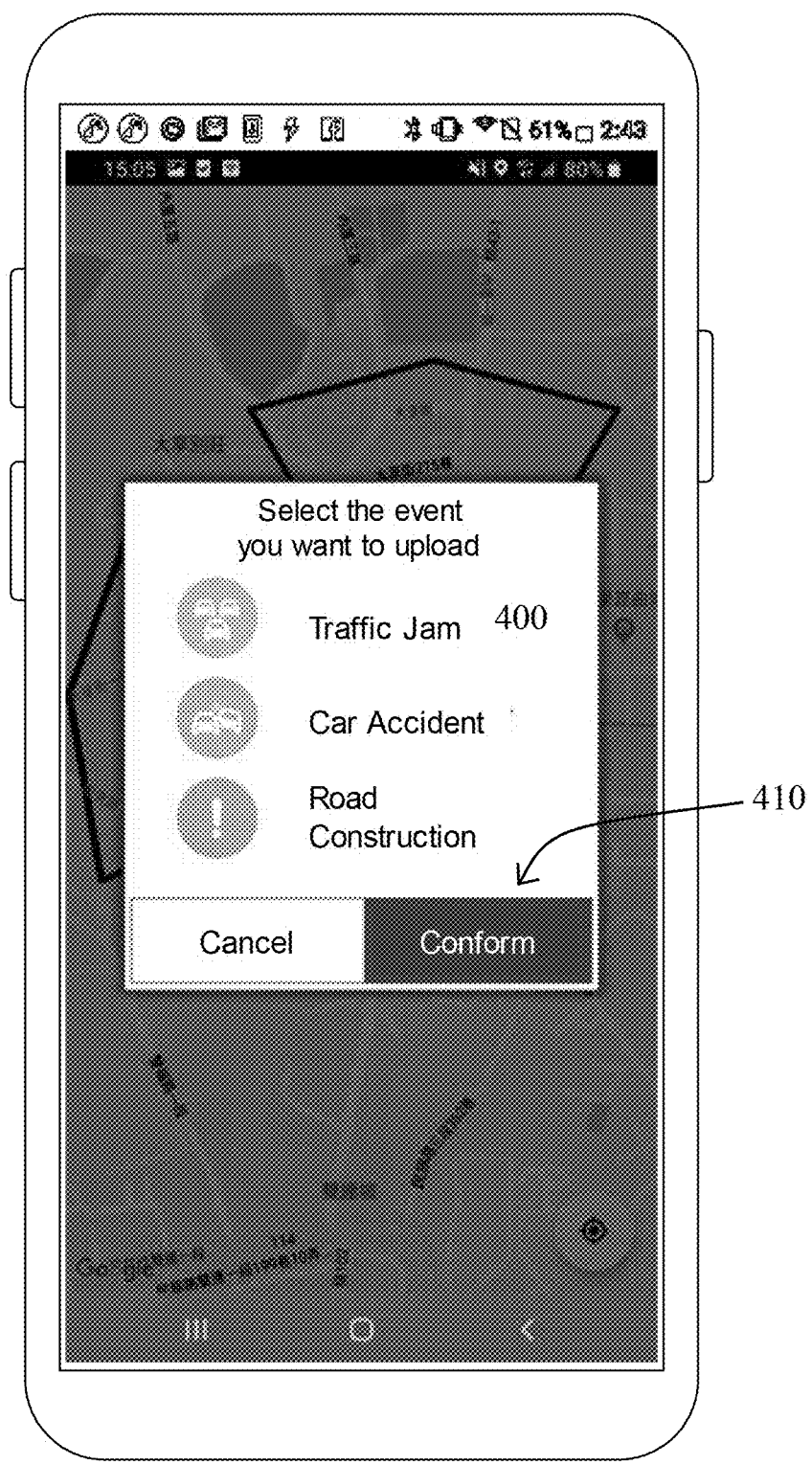
FIG. 13 is a schematic diagram illustrating a traffic event upload user interface of the App, according to the method described in the present invention.

FIG. 13 is a schematic diagram illustrating a traffic event upload user interface of the App, according to the method described in the present invention. In an embodiment, the App can include a traffic event upload user interface 400 configured to provide the user to upload a traffic event to the traffic event table of the traffic server. After the user enters the traffic event upload user interface 400 by a clicking operation, as shown in FIG. 13, the user just needs to select the event category (title) and then clicks a confirm button 410, so that the upload operation can be completed. The App can directly report the longitude and latitude of the current location as the occurrence location of the traffic event and report the current time as the occurrence time of the traffic event.

Figure 14:
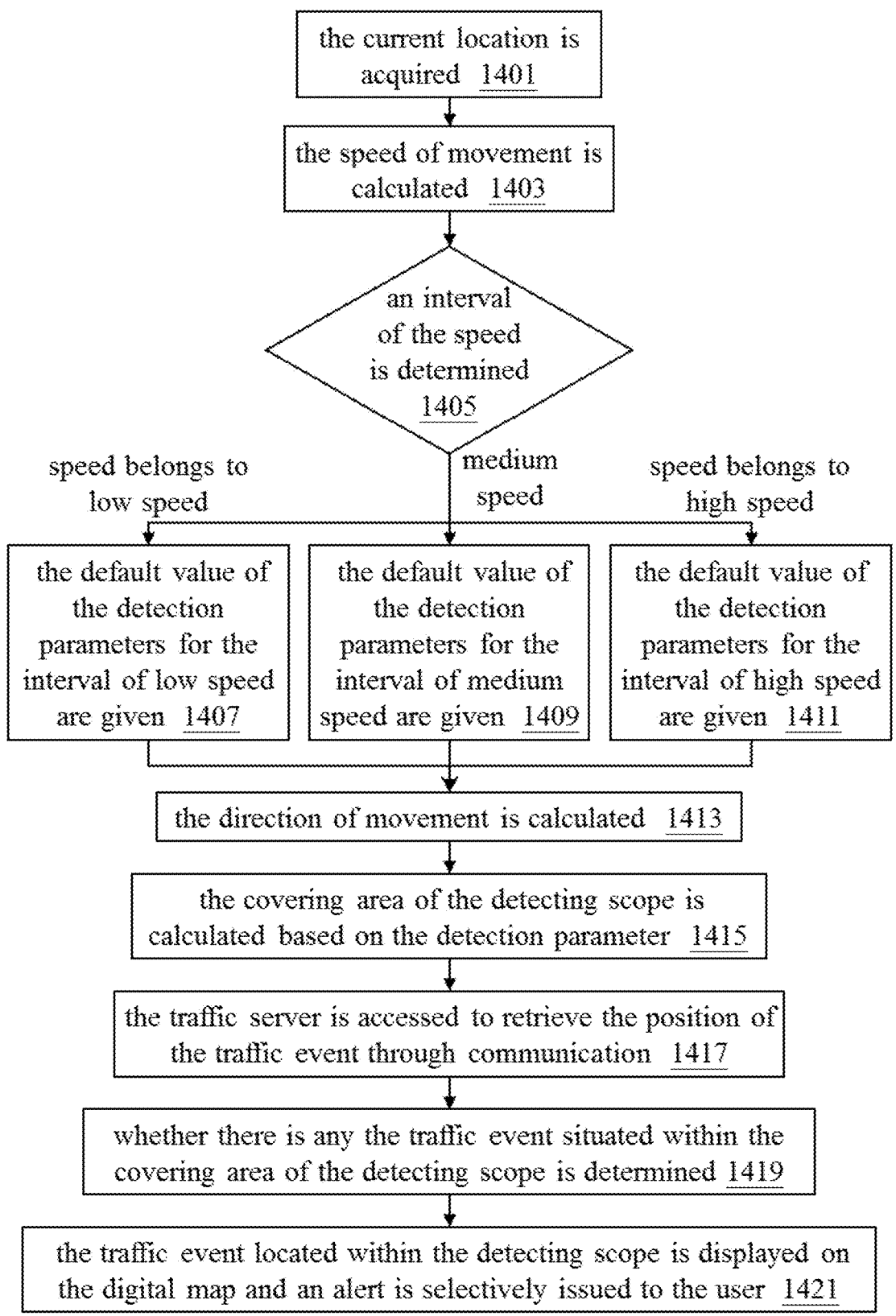
FIG. 14 is a flowchart showing implementation steps included in a traffic situation detecting method described in the present invention.

FIG. 14 is a flowchart showing implementation steps included in a traffic situation detecting method described in the present invention. The traffic situation detecting method described in the present invention includes following particular steps. In a step 1401 the current location is acquired; in a step 1403, the speed of movement is calculated; in a step 1405, an interval of the speed to which the speed of movement belongs is determined, and when the speed belongs to the interval of low speed, a step 1407 is executed, and the default value of the detection parameters for the interval of low speed are given; when the speed belongs to the interval of medium speed, a step 1409 is executed, and the default value of the detection parameters for the interval of medium speed are given; when the speed belongs to the interval of high speed, a step 1411 is executed, and the default value of the detection parameters for the interval of high speed are given.

After the operation of setting the default value of the detection parameter is complete, the method executes a step 1413; in the step 1413, the direction of movement is calculated; in a step 1415, the covering area of the detecting scope is calculated based on the detection parameter; in a step 1417, the traffic server is accessed to retrieve the position of the traffic event through communication; in a step 1419, whether there is any the traffic event situated within the covering area of the detecting scope is determined; in a step 1421, the traffic event located within the detecting scope is displayed on the digital map and an alert is selectively issued to the user.

Figure 15:
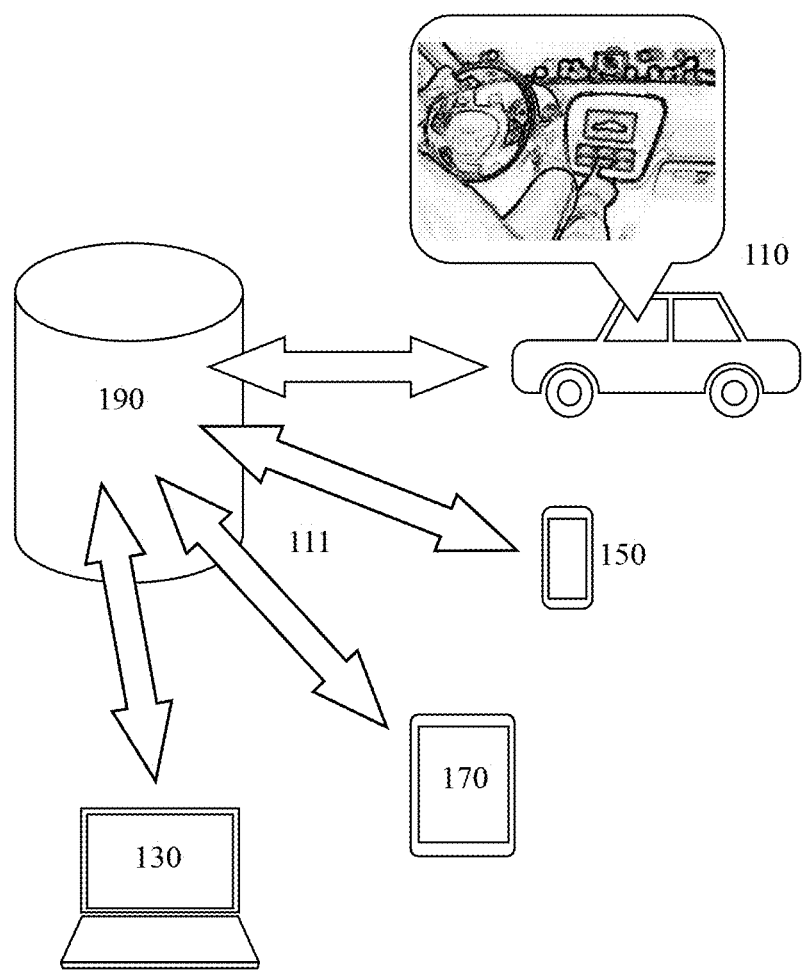
FIG. 15 is a schematic diagram illustrating a map-based traffic situation detecting device with adaptively variable detecting scope, according to the present invention.

FIG. 15 is a schematic diagram illustrating a map-based traffic situation detecting device with adaptively variable detecting scope, according to the present invention. The map-based traffic situation detecting method with adaptively variable detecting scope of the present invention can be programmed as a computer program product, an App or computer software which can be loaded into and executed by a processor of the movable device. The computer program product, mobile application or computer software described in the present invention means the object carrying the program executable for the processor, and the external form of the object is not limited. After an electronic device including a processor loads the computer program product, the App or the computer software, which can execute the map-based traffic situation detecting method with adaptively variable detecting scope of the present invention, the electronic device becomes the map-based traffic situation detection device with adaptively variable detecting scope of the present invention.

For example, as shown in FIG. 15, after an in-vehicle computer 110, a notebook computer 130, a smart phone 150, a tablet device 170 or other mobile electronic device including the processor loads the computer program product, the App or the computer software, which can execute the map-based traffic situation detecting method with adaptively variable detecting scope of the present invention, the above-mentioned electronic device becomes the map-based traffic situation detection device with adaptively variable detecting scope of the present invention. Preferably, the in-vehicle computer 110, the notebook computer 130, the smart phone 150 or the tablet device 170 of FIG. 15, or any mobile electronic device including the processor can be linked to a remote traffic server 190, so as to access the traffic event table through internet network 111 after the detecting scope is determined.

According to above-mentioned contents, the map-based traffic situation detecting method with adaptively variable detecting scope of the present invention can vary the detecting scope in response to the interval of the speed to which the current speed of movement belongs, and when the current speed of the user is in the interval of high speed, a narrower detecting scope with a longer detection distance and a smaller view angle is displayed to make the user have sufficient response time; when the current speed of the user is in the interval of low speed, a wider detecting scope with a shorter detection distance and a larger view angle is displayed. In other words, the main inventive concept of the method described in the present invention is the special shape of the detecting scope toward the direction of movement of the vehicle, and the detection angle and detection distance of the detecting scope can be varied in response to the change in the speed of movement. Particularly, the method described in the present invention is suitable for providing the driver with an unplanned traffic situation such as a temporary traffic event or a sudden traffic situation, and traffic information related to driving safety, so that the driver can early respond calmly.

There are further embodiments provided as follows.

Embodiment 1: A traffic situation detecting method includes acquiring a current location, a speed of movement and a direction of movement for a ground vehicle; using the current location as a starting point and drawing a detecting scope on a digital map toward the direction of movement; varying a size of the detecting scope in adaptive to an interval of the speed to which the speed of movement belongs; accessing a traffic server to retrieve a traffic event and determining whether the traffic event is situated within the detecting scope; and marking the traffic event located within the detecting scope on a digital map.

Embodiment 2: The traffic situation detecting method according to Embodiment 1 further includes one of steps: acquiring the current location for the ground vehicle through a mobile device, and calculating the speed of movement and the direction of movement based on the current location; acquiring the speed of movement for the ground vehicle through an in-vehicle computer; determining the interval of the speed to which the speed of movement belongs, to set a detection parameter corresponding to the determined interval of the speed; performing a detecting scope drawing process based on the detection parameter; displaying the digital map on a screen; checking a position of the detecting scope on the digital map; marking the current location on the digital map, using the current location as the starting point and drawing the detecting scope toward the direction of movement; adaptively setting the detection parameter to vary the size of the detecting scope based on the determined interval of the speed; accessing a traffic event table of the traffic server; reading the traffic event table to determine whether a traffic event is situated within the detecting scope: marking the traffic event located within the detecting scope on a digital map; and issuing an alert to prompt a user for the traffic event located within the detecting scope.

Embodiment 3: The traffic situation detecting method according to Embodiment 2, the detection parameter is one of a detection distance, a detection angle and a combination thereof.

Embodiment 4: The traffic situation detecting method according to Embodiment 3, the detecting scope drawing process includes one of steps: determining values of the detection distance and the detection angle; on the digital map, using the current location as the starting point and drawing a straight line toward the direction of movement, and using the detection distance as a length of the straight line; calculating and drawing a perpendicular bisector of the straight line; using the current location as the starting point and using the detection angle or a half of the detection angle as an included angle to draw a right line and a left line on left and right sides of the straight line, respectively; using a crossover point of the right line and the perpendicular bisector, and a crossover point of the left line and the perpendicular bisector as a left point and a right point, respectively; connecting the current location, the left point and the right point to obtain a first triangle; duplicating the first triangle, and flipping duplicate of the first triangle upside down to obtain a second triangle; combining the first triangle and the second triangle to form a symmetrical diamond as the detecting scope; and displaying the drawn detecting scope on the digital map.

Embodiment 5: The traffic situation detecting method according to Embodiment 2, the mobile device is a smart phone, a notebook computer, a tablet device, or the in-vehicle computer.

Embodiment 6: The traffic situation detecting method according to Embodiment 2, the mobile device includes one of a processor, an accelerometer, a gyro-meter, a Wi-Fi module, a global position system (GPS) module and a combination thereof, to provide one of the current location, the speed of movement and the direction of movement.

Embodiment 7: The traffic situation detecting method according to Embodiment 1, the ground vehicle is one of a vehicle, a car, a four wheeled car, a three wheeled motorcycle, a two wheeled motorcycle, a bicycle, an internal combustion engine (ICE) vehicle, and an electric vehicle.

Embodiment 8: The traffic situation detecting method according to Embodiment 1, the detecting scope is a symmetrical diamond shape, an asymmetrical diamond shape, a polygon, a quadrangle, a sector or a triangle.

Embodiment 9: A traffic situation detecting device configured to have a processor to implement a traffic situation detecting method, the method includes acquiring a current location, a speed of movement and a direction of movement for a ground vehicle; using the current location as a starting point and drawing a detecting scope on a digital map toward the direction of movement; adaptively varying a size of the detecting scope in response to an interval of the speed to which the speed of movement belongs; accessing a traffic server to retrieve a traffic event and determining whether the traffic event is situated within the detecting scope; and marking the traffic event located within the detecting scope on a digital map.

Embodiment 10: A non-transitory computer-readable medium storing thereon a computer program including instructions that, when executed by a processor, cause the processor to perform a traffic situation detecting method, by executing the steps including: acquiring a current location, a speed of movement and a direction of movement for a ground vehicle; using the current location as a starting point and drawing a detecting scope on a digital map toward the direction of movement; adaptively varying a size of the detecting scope in response to an interval of the speed to which the speed of movement belongs; accessing a traffic server to retrieve a traffic event and determining whether the traffic event is situated within the detecting scope; and marking the traffic event located within the detecting scope on a digital map.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A traffic situation detecting method, comprising:
  acquiring a current location, a speed of movement and a direction of movement for a ground vehicle;
  using the current location as a starting point and drawing a detecting scope on a digital map toward the direction of movement;
  varying a size of the detecting scope in adaptive to an interval of the speed to which the speed of movement belongs;
  accessing a traffic server to retrieve a traffic event and determining whether the traffic event is situated within the detecting scope; and
  marking the traffic event located within the detecting scope on a digital map,
  wherein the traffic situation detecting method further comprises one of following steps:
  acquiring the current location for the ground vehicle through a mobile device, and calculating the speed of movement and the direction of movement based on the current location;
  acquiring the speed of movement for the ground vehicle through an in-vehicle computer;

determining the interval of the speed to which the speed of movement belongs, to set a detection parameter corresponding to the determined interval of the speed;

performing a detecting scope drawing process based on the detection parameter;

displaying the digital map on a screen;

checking a position of the detecting scope on the digital map;

marking the current location on the digital map, using the current location as the starting point and drawing the detecting scope toward the direction of movement;

adaptively setting the detection parameter to vary the size of the detecting scope based on the determined interval of the speed;

accessing a traffic event table of the traffic server;

reading the traffic event table to determine whether a traffic event is situated within the detecting scope;

marking the traffic event located within the detecting scope on a digital map; and issuing an alert to prompt a user for the traffic event located within the detecting scope.

2. The traffic situation detecting method according to claim 1, wherein the detection parameter is one of a detection distance, a detection angle and a combination thereof.

3. The traffic situation detecting method according to claim 2, wherein the detecting scope drawing process comprises one of steps:

determining values of the detection distance and the detection angle;

on the digital map, using the current location as the starting point and drawing a straight line toward the direction of movement, and using the detection distance as a length of the straight line;

calculating and drawing a perpendicular bisector of the straight line;

using the current location as the starting point and using the detection angle or a half of the detection angle as an included angle to draw a right line and a left line on left and right sides of the straight line, respectively;

using a crossover point of the right line and the perpendicular bisector, and a crossover point of the left line and the perpendicular bisector as a left point and a right point, respectively;

connecting the current location, the left point and the right point to obtain a first triangle;

duplicating the first triangle, and flipping duplicate of the first triangle upside down to obtain a second triangle;

combining the first triangle and the second triangle to form a symmetrical diamond as the detecting scope; and displaying the drawn detecting scope on the digital map.

4. The traffic situation detecting method according to claim 1, wherein the mobile device is a smart phone, a notebook computer, a tablet device, or the in-vehicle computer.

5. The traffic situation detecting method according to claim 1, wherein the mobile device comprises one of a processor, an accelerometer, a gyro-meter, a Wi-Fi module, a global position system (GPS) module and a combination thereof, to provide one of the current location, the speed of movement and the direction of movement.

6. The traffic situation detecting method according to claim 1, wherein the ground vehicle is one of a vehicle, a car, a four wheeled car, a three wheeled motorcycle, a two wheeled motorcycle, a bicycle, an internal combustion engine (ICE) vehicle, and an electric vehicle.

7. The traffic situation detecting method according to claim 1, wherein the detecting scope is a symmetrical diamond shape, an asymmetrical diamond shape, a polygon, a quadrangle, a sector or a triangle.

8. A traffic situation detecting device, configured to have a processor to implement a traffic situation detecting method, the traffic situation detecting method comprising:

acquiring a current location, a speed of movement and a direction of movement for a ground vehicle;

using the current location as a starting point and drawing a detecting scope on a digital map toward the direction of movement;

adaptively varying a size of the detecting scope in response to an interval of the speed to which the speed of movement belongs;

accessing a traffic server to retrieve a traffic event and determining whether the traffic event is situated within the detecting scope; and marking the traffic event located within the detecting scope on a digital map, wherein the traffic situation detecting method further comprises one of following steps:

acquiring the current location for the ground vehicle through a mobile device, and calculating the speed of movement and the direction of movement based on the current location;

acquiring the speed of movement for the ground vehicle through an in-vehicle computer;

determining the interval of the speed to which the speed of movement belongs, to set a detection parameter corresponding to the determined interval of the speed;

performing a detecting scope drawing process based on the detection parameter;

displaying the digital map on a screen;

checking a position of the detecting scope on the digital map;

marking the current location on the digital map, using the current location as the starting point and drawing the detecting scope toward the direction of movement;

adaptively setting the detection parameter to vary the size of the detecting scope based on the determined interval of the speed;

accessing a traffic event table of the traffic server;

reading the traffic event table to determine whether a traffic event is situated within the detecting scope;

marking the traffic event located within the detecting scope on a digital map; and issuing an alert to prompt a user for the traffic event located within the detecting scope.

9. A non-transitory computer-readable medium storing thereon a computer program including instructions that, when executed by a processor, cause the processor to implement a traffic situation detecting method, by executing the steps comprising:

acquiring a current location, a speed of movement and a direction of movement for a ground vehicle;

using the current location as a starting point and drawing a detecting scope on a digital map toward the direction of movement;

adaptively varying a size of the detecting scope in response to an interval of the speed to which the speed of movement belongs;

accessing a traffic server to retrieve a traffic event and determining whether the traffic event is situated within the detecting scope; and marking the traffic event located within the detecting scope on a digital map, wherein the traffic situation detecting method further comprises one of following steps:

acquiring the current location for the ground vehicle through a mobile device, and calculating the speed of movement and the direction of movement based on the current location;

acquiring the speed of movement for the ground vehicle through an in-vehicle computer;

determining the interval of the speed to which the speed of movement belongs, to set a detection parameter corresponding to the determined interval of the speed;

performing a detecting scope drawing process based on the detection parameter;

displaying the digital map on a screen;

checking a position of the detecting scope on the digital map;

marking the current location on the digital map, using the current location as the starting point and drawing the detecting scope toward the direction of movement;

adaptively setting the detection parameter to vary the size of the detecting scope based on the determined interval of the speed;

accessing a traffic event table of the traffic server;

reading the traffic event table to determine whether a traffic event is situated within the detecting scope;

marking the traffic event located within the detecting scope on a digital map; and issuing an alert to prompt a user for the traffic event located within the detecting scope.

* * * * *